United States Patent [19]

Sakimura et al.

[11] Patent Number: 5,440,112

[45] Date of Patent: Aug. 8, 1995

[54] SURVEYING INSTRUMENT HAVING MODE JUDGEMENT MEANS

[75] Inventors: Ritsuo Sakimura; Kazuaki Kimura; Hiroshi Inaba, all of Tokyo, Japan

[73] Assignee: Kabushiki Kaisha Topcon, Tokyo, Japan

[21] Appl. No.: 195,136

[22] Filed: Feb. 14, 1994

[30] Foreign Application Priority Data

Feb. 12, 1993 [JP] Japan .................. 5-024000

[51] Int. Cl.$^6$ .............................................. G01J 1/20
[52] U.S. Cl. ............................ 250/203.1; 250/559.38; 356/141.4
[58] Field of Search .................. 250/203.1, 203.2, 206.1, 250/561; 356/400, 401, 141.2, 141.3, 141.4, 152.3

[56] References Cited

U.S. PATENT DOCUMENTS

| | | | |
|---|---|---|---|
| 3,603,688 | 9/1971 | Smith-Vaniz | 250/203.1 |
| 4,324,491 | 4/1982 | Hueber | 356/141.4 |
| 4,413,904 | 11/1983 | Hamada et al. | |
| 4,615,615 | 10/1986 | Krolak et al. | 356/141.4 |
| 4,622,458 | 11/1986 | Boeck et al. | 250/203.1 |
| 5,033,845 | 7/1991 | Sorimachi et al. | 356/141.4 |
| 5,051,934 | 9/1991 | Wiklund | 356/152.3 |
| 5,110,202 | 5/1992 | Dornbusch et al. | 356/141.4 |

Primary Examiner—Stephone B. Allen
Attorney, Agent, or Firm—Finnegan, Henderson, Farabow, Garrett & Dunner

[57] ABSTRACT

A surveying instrument includes a main body and a terminal portion located away from the main body. The main body includes a measuring unit 20 capable of operating in a tracking mode in which a target 11 for searching a set out point S to be set out at a point of land is tracked and a measuring mode in which the position of the target 11 is measured, a first communication unit 15 for transmitting data concerning a target position measured by the measuring unit to the terminal portion, a mode judging unit 47 for judging that the measuring unit is operating in the tracking or measuring mode, and a result informing unit 54 for informing a result obtained by the mode judging unit 47 toward the side of the target. The terminal portion includes a second communication unit 13B for receiving data transmitted from the first communication unit, a memory unit 57 for storing position data concerning the set out point, a calculating unit 55 for calculating a difference between the positions of the set out point and the target on the basis of the data concerning the set out point stored in the memory unit 57 and the data transmitted from the main body, and a display unit 58 for displaying the difference.

5 Claims, 13 Drawing Sheets

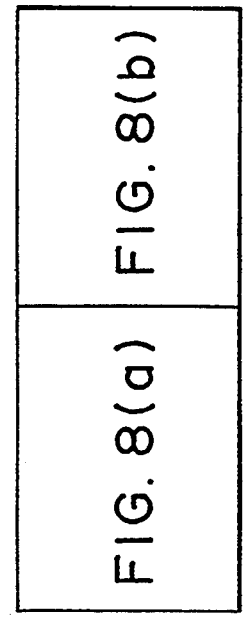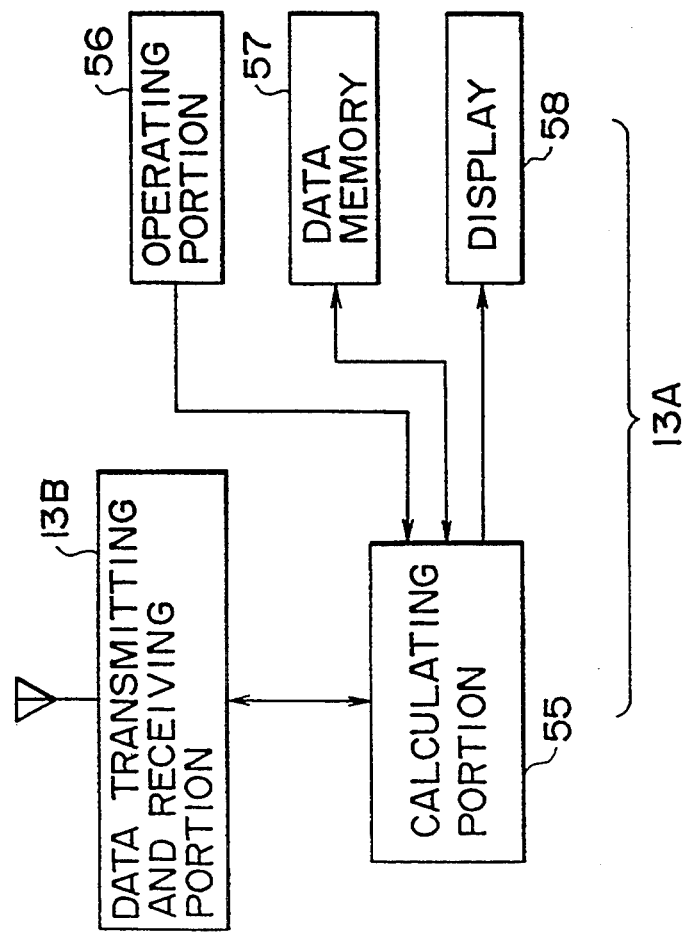

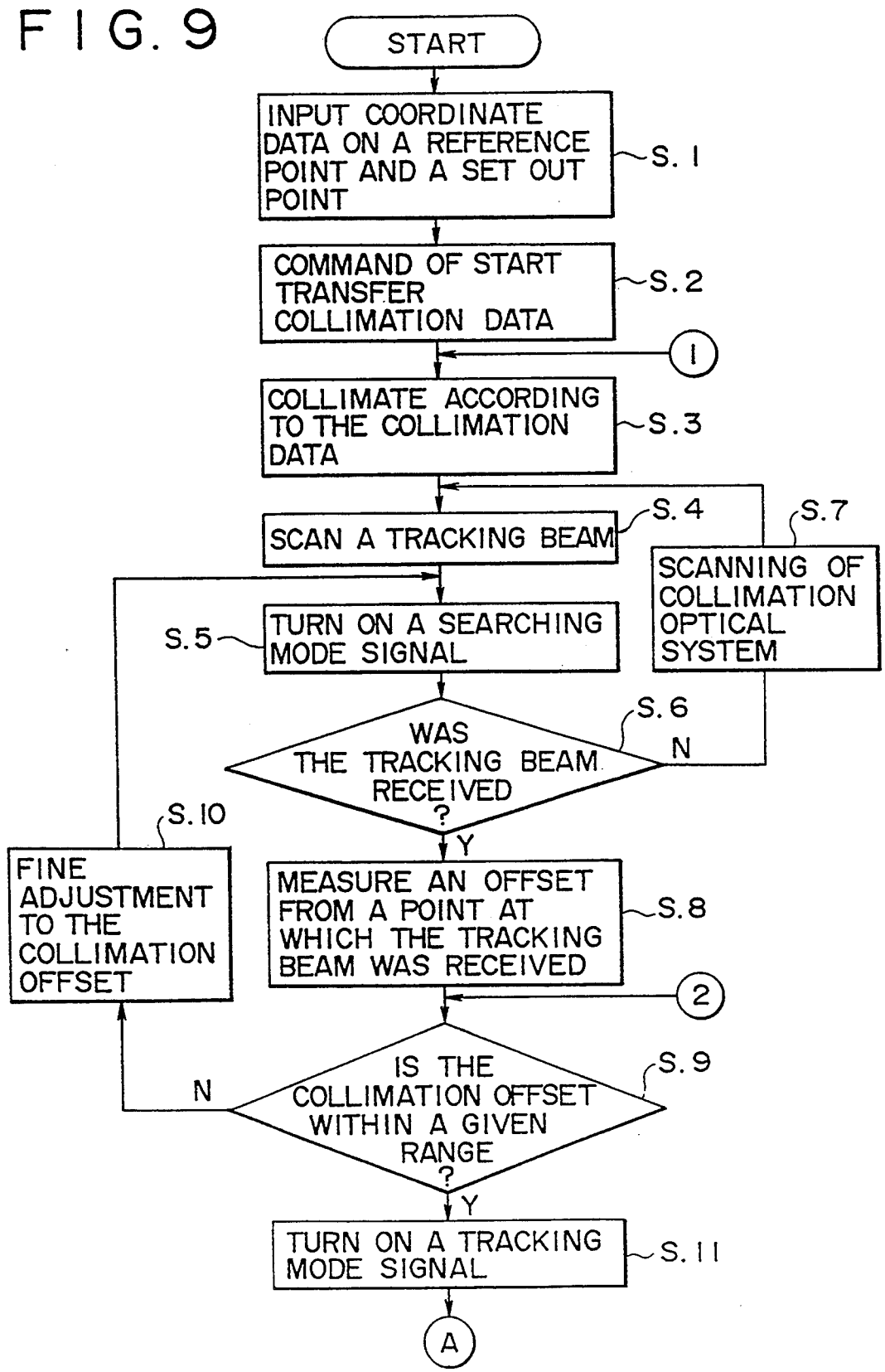

SURVEYING INSTRUMENT HAVING MODE JUDGEMENT MEANS

BACKGROUND OF THE INVENTION

1. Field of the Invention

This invention relates to a surveying instrument for automatically tracking a target, such as a corner-cube reflector, and more particularly to the improvements in the surveying instrument for measuring a distance between the target and the instrument or an angle of a target-instrument line with a reference line.

2. Description of the Prior Art

Heretofore, a surveying method is known in order to search and determine a set out point with a surveying instrument for collimating a target such as a corner-cube reflector. As shown in FIG. 1, in the surveying method, a main body of the surveying instrument is located at a point P as a known point whereas the target is set at a point C in the vicinity of a set out point B as an unknown point. The set out point is defined as an unknown point of land corresponding to a point represented on a map. An operator stationed on the side of the main body collimates the target to determine the target point C. On the map, a positional difference between the points C and B is calculated with respect to the measured point C. For the calculation, the operator measures a distance $\Delta\alpha$ in an X-axis direction and a distance $\Delta\beta$ in a Y-axis direction in such a manner that the position of the set out point B is resolved into components of coordinates having an X axis (an optical axis 0 of a telescope mounted on the main body) and a Y axis (an axis perpendicular to the optical axis 0). The operator on the side of the main body informs an assistant on the side of the target about its result. The assistant with the target moves so that the difference between the target point and the set out point turns lessened. With the cooperation between the operator and assistant, the set out point is determined as a point of land corresponding to a point designated on the map.

In the conventional survey, at least two workers, one of whom is stationed on the side of the main body of the surveying instrument and the other on the side of the target, are needed.

It is preferable that the survey is carried out by only the worker stationed on the side of the target, in other words, to quit stationing an operator on the side of the main body for reducing the number of the workers.

To do so, it is needed to automatically inform the worker on the side of the target about whether the measurement of the target is completed or not. Such information is also needed in a case where more than two targets are used to measure distances or angles. That is, it is needed to automatically inform a plurality of workers with targets about whether the main body of the instrument is operating in a measuring mode in which the measurements of the respective targets are individually carried out. If the measuring mode is selected for one of the targets, it is impossible to track the other targets.

SUMMARY OF THE INVENTION

It is therefore an object of the invention to provide a surveying instrument adapted to quit staffing the side of the main body of the surveying instrument with a worker.

To accomplish the object, the surveying instrument according to the invention of claim 1 comprises a main body including a measuring unit capable of operating in a tracking mode in which a target for searching a set out point to be set out at a desired point of land is tracked and a measuring mode in which a position of the target is measured and a terminal portion located away from the main body. The main body further includes a first communication unit for transmitting data concerning a target position measured by the measuring unit to the terminal portion, a mode judging unit for judging that the measuring unit is operating in the tracking or measuring mode, and a result informing unit for informing a result obtained by the mode judging unit toward the side of the target. The terminal portion includes a second communication unit for receiving data transmitted from the first communication unit, a memory unit for storing position data concerning the set out point, a calculating unit for calculating a difference between the positions of the set out point and the target on the basis of data concerning the set out point stored in the memory unit and data transmitted from the main body, and a display unit for displaying the difference.

The surveying instrument according to the invention of claim 2 comprises a main body including a measuring unit capable of operating in a tracking mode in which a target for searching a set out point to be set out at a desired point of land is tracked and a measuring mode in which a position of the target is measured and a terminal portion located away from the main body. The main body further includes a memory unit for storing position data concerning the set out point, a first communication unit for transmitting data concerning a target position measured by the measuring unit and data concerning the set out point stored in the memory unit to the terminal portion, a mode judging unit for judging that the measuring unit is operating in the tracking or measuring mode, and a result informing unit for informing a result obtained by the mode judging unit toward the side of the target. The terminal portion includes a second communication unit for receiving data transmitted from the first communication unit, a calculating unit for calculating a difference between the positions of the set out point and the target on the basis of data transmitted from the main body, and a display unit for displaying the difference.

According to the surveying instrument, the measuring unit tracks a target according to a signal output by the terminal portion on the side of the target and measures the position of the target. In tracking and measuring, the informing unit informs the worker of that it is operating in a tracking mode when the tracking mode is selected in the measuring unit whereas the informing unit informs the worker of that it is operating in a measuring mode when the measuring mode is selected in the measuring unit. Therefore, the worker stationed on the side of the target can know that the tracking or measuring mode is selected in the measuring unit. Further, there is a case where a plurality of workers are engaged in surveying when a plurality of set out points are searched and where some of the workers on the side of the target are apart from the terminal portion. However, those workers can also know which mode is selected in the measuring unit.

BRIEF DESCRIPTION OF THE DRAWINGS

FIG. 8 illustrates arrangement of FIGS. 8A and 8B.

FIGS. 8A and 8B is a block circuit diagram of the surveying instrument according to the invention.

FIG. 9 is a flowchart showing an early stage of a surveying process of the surveying instrument.

DETAILED DESCRIPTION OF THE PREFERRED EMBODIMENT

The embodiment of a surveying instrument according to the invention will now be described with reference to the attached drawings.

Figure 1:
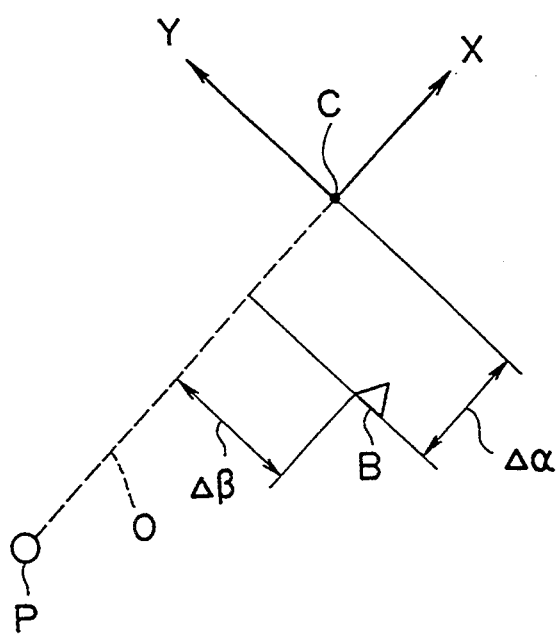
FIG. 1 is a descriptive drawing showing an example of a conventional survey.
Figure 2:
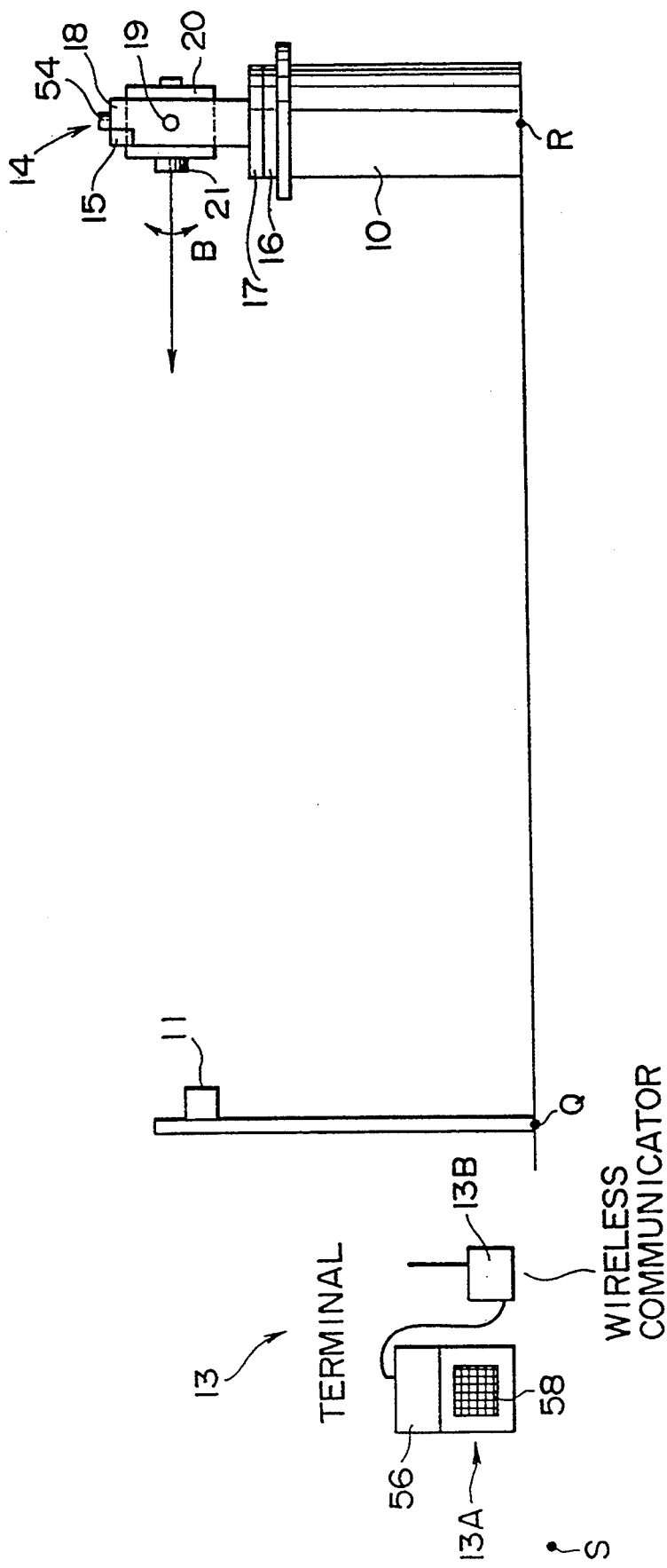
FIG. 2 is a side view showing a surveying instrument according to the invention in use.

Referring to FIG. 2, the numeral 10 designates a set base located at, for example, a known point R, 11 designates a corner-cube reflector as a target located at a point Q, 13 designates a portable electronic device as a terminal portion located in the vicinity of the corner-cube reflector 11, 14 designates a surveying instrument mounted on the set base 10, 15 designates a wireless communicator as a first communication unit, and S designates a set out point as an unknown point. The corner-cube reflector 11 is located in the vicinity of the set out point at an operator's rough guess. The instrument 14 includes a bottom-fixed-table 16 and a rotary table 17 moving in a horizontal plane. As shown in FIG. 8, the rotary table 17 having a supporting portion 18 is rotated in the direction of an arrow A with respect to the bottom-fixed-table 16. The supporting portion 18 is provided with a rotating shaft 19 for rotating a main body 20 as an optical portion in a vertical direction. The main body 20 is rotated in a horizontal plane by the rotation of the rotary table 17 and is rotated in a vertical plane by the rotation of the shaft 19 as shown by the arrow B in FIG. 2. The wireless communicator 15 is mounted on the supporting portion 18 in this embodiment.

Figure 4:
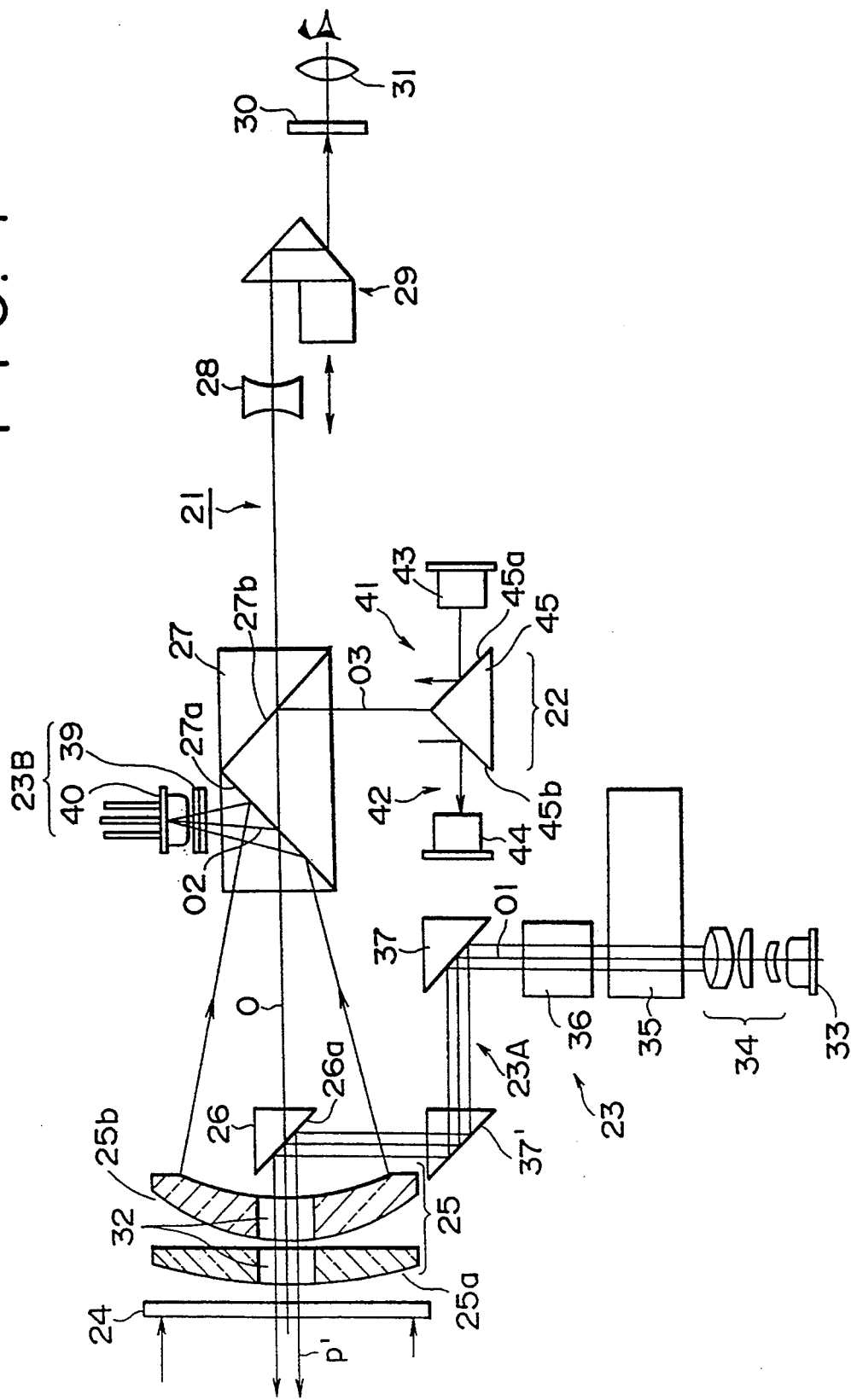
FIG. 4 is a view showing an optical system of the surveying instrument according to the invention.
Figure 5:
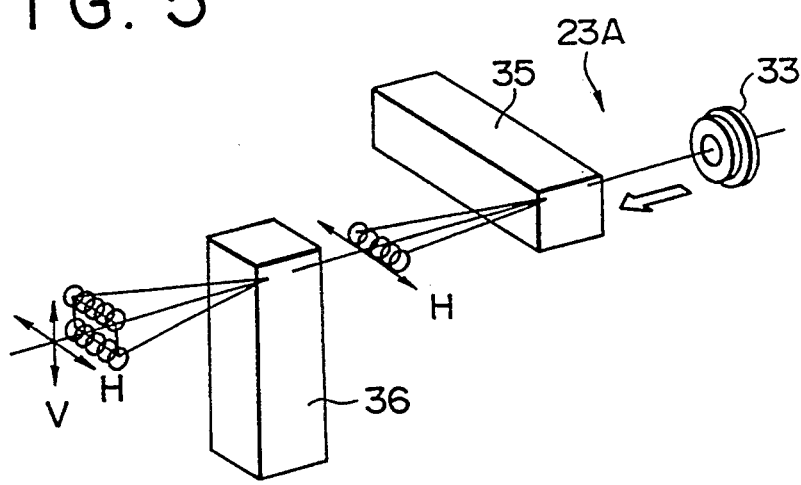
FIG. 5 is a schematic descriptive drawing of polarization in an automatic tracking optical system of the surveying instrument.
Figure 6:
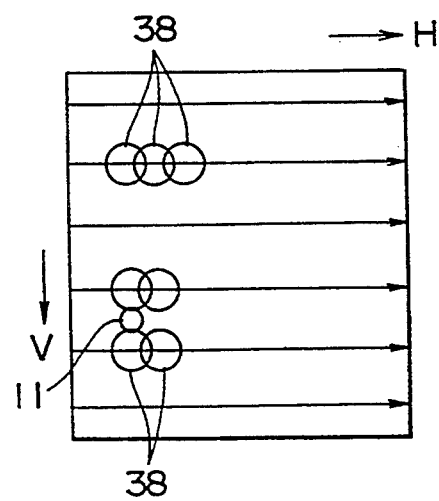
FIG. 6 is a schematic view of scanning carried out by the tracking optical system.
Figure 7:
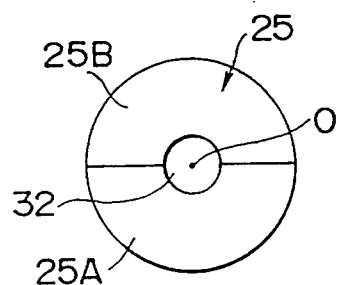
FIG. 7 is a plan view of an objective lens of FIG. 4.

As shown in FIG. 4, the main body 20 includes a collimation optical system 21, measuring optical system 22, and automatic tracking optical system 23. The collimation optical system 21 serves to collimate a corner-cube reflector 11 and includes a cover glass 24, objective lens 25, optical path combining prism 26, optical path splitting prism 27, focusing lens 28, Porro prism 29, focusing mirror 30, and eyepiece 31. The objective lens 25 has a through-hole portion 32. The optical path combining prism 26 also serves as a part of a tracking projection system 23A of the tracking optical system 23. The tracking optical system 23 scans the corner-cube reflector 11 in vertical and horizontal directions and track it automatically. The tracking projection system 23A includes a laser diode 33, collimator lens 34, horizontal polarizer 35 which produces horizontally polarized light, vertical polarizer 36 which produces vertically polarized light, and reflecting prisms 37, 37'. The laser diode 33 projects an infrared laser beam of light a wavelength of which is 900 nanometer. The collimator lens 84 changes the infrared laser beam into a beam of parallel rays of light. For the horizontal and vertical polarizers 35, 36, an acoustic optical device is employed. As shown in FIG. 5, the horizontal polarizer 35 polarizes the infrared laser beam in a horizontal direction H whereas the vertical polarizer 36 polarizes it in a vertical direction V. The optical path combining prism 26 having a total reflection surface 26a makes an optical axis 01 of the projection system 23A coincide with an optical axis of the objective lens 25 (i.e., the optical axis 0 of the collimation optical system 21). The infrared laser beam polarized in the horizontal and vertical directions is reflected by the reflecting prisms 37, 37' and the total reflection surface 26a and is emitted from the main body 20 via the throughhole portion 32, so that the corner-cube reflector 1 is scanned. The corner-cube reflector 11 is scanned as shown in FIG. 6. That is, the laser beam is first horizontally polarized and moved in the horizontal direction H and then vertically polarized and moved a little in the vertical direction V. This movement is successively repeated to examine the next horizontal direction H. The numeral 38 designates beam spots of the infrared laser beam P' within a plane including the corner-cube reflector 11. The infrared laser beam P' reflected by the corner-cube reflector 11 is converged by the objective lens 25 except the throughhole portion 32 upon the optical path splitting prism 27 having reflecting surfaces 27a, 27b. The reflecting surface 27a reflects the infrared laser beam P' toward a tracking receiving system 23B of the tracking optical system 23. The tracking receiving system 23B includes a filter 39 for removing noise light or unwanted light and a light receiving element 40. An optical axis 02 of the tracking receiving system 23B coincides with the optical axis 0 of the collimation optical system 21. The optical path splitting prism 27 transmits visible light and reflects the infrared beam P' of light toward the tracking receiving system 23B. The measuring optical system 22 includes a light projecting system 41 and a light receiving system 42. The projecting and receiving systems 41, 42 have a laser source 43 and a light receiving element 44, respectively. The projection and receiving systems 41, 42 share a triangular prism 45 with each other. The laser source 43 emits an infrared laser beam of light having a wavelength of 800 nanometer which is different from a wavelength of the infrared beam of light P for tracking. The infrared beam P' for measuring is reflected by a reflecting surface 45a of the triangular prism 45 and guided to the reflecting surface 27b of the optical path splitting prism 27. The reflecting surface 27b transmits visible light and reflects an infrared beam of light including light having a wavelength of 800 nanometer. The measuring infrared beam P' guided to the reflecting surface 27b passes through the reflecting surface 27a and then, as shown in FIG. 7, passes through a lower half 25A of the objective lens 25. And the measuring infrared beam P' of light as a plane wave is emitted out of the main body 20. The measuring infrared beam P' is reflected by the corner-cube reflector 11, is guided to the objective lens 25 through the cover glass 24, is converged by the upper half 25b of the objective lens 25, is guided to the reflecting surface 27b through the reflecting surface 27a of the optical path splitting prism 27, is guided to the reflecting surface 45b of the triangular prism 45 by the reflecting surface 27b, and is converged upon the light receiving element 44.

Figure 3:
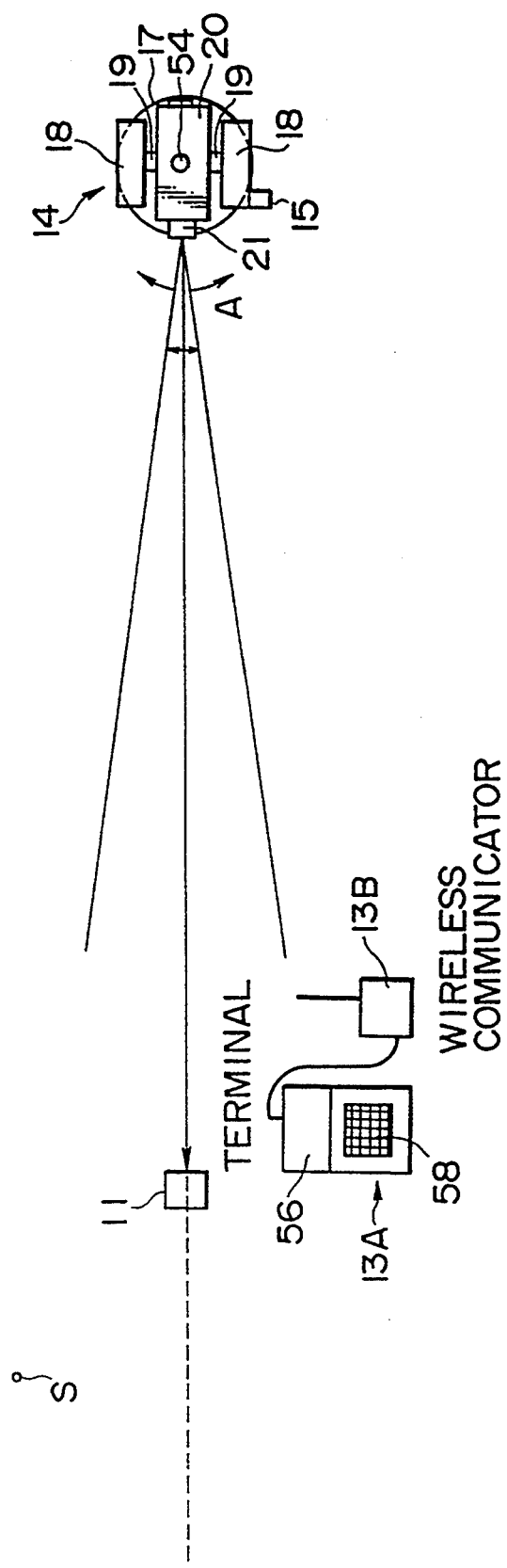
FIG. 3 is a top view of FIG. 2.
Figure 8A:
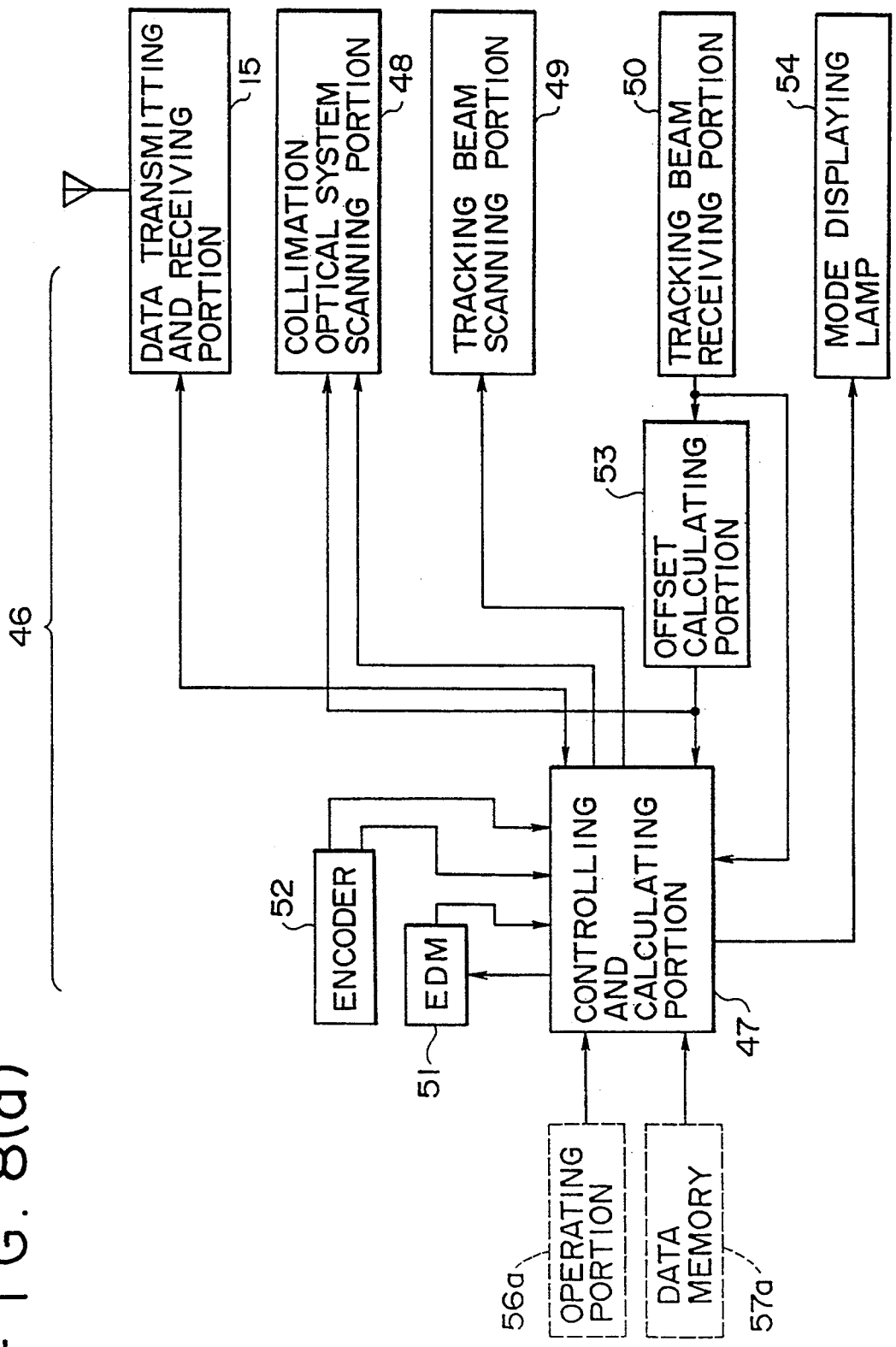

As shown in FIG. 8A, the main body 20 includes an electronic circuit 46 as a measuring portion. The electronic circuit 46 includes a controlling and calculating portion 47, collimation optical system scanning portion 48, tracking beam scanning portion 49, tracking beam receiving portion 50, electro-optical distance measuring portion (EDM) 51, encoder 52, calculating portion 53 for calculating an offset between the corner-cube reflector and a collimation axis, and measuring mode displaying lamp 54. For a basic arrangement of the surveying instrument, a digital transit can be employed. As shown in FIGS. 2 and 3, the measuring mode displaying lamp 54 is mounted on the top of the main body 20. A pulse signal from the encoder 52 is input to the controlling and calculating portion 47, so that angles of rotation in horizontal and vertical directions (horizontal and vertical angles) are detected with respect to a reference position of the main body 20. The controlling and calculating portion 47 is connected to the wireless communicator 15. The controlling and calculating portion 47 starts the measurement when the portion 47 receives a measurement starting command which will be hereinafter described. If the corner-cube reflector 11 does not appear within the sight of the collimation optical system 21, the collimation optical system scanning portion 48 causes the main body 20 to be rotated by a command of the controlling and calculating portion 47 so as to locate the corner-cube reflector 11 within the sight of the collimation optical system 21. The tracking beam scanning portion 49 controls the laser diode 33, horizontal polarizer 35, and vertical polarizer 36 by a command of the controlling and calculating portion 47. The tracking beam receiving portion 50 includes the light receiving element 40. A signal output by the the light receiving element 40 is input to the offset calculating portion 53. The offset calculating portion 53 calculates offsets or separations between the optical axis 0 of the collimation optical system 21 and the horizontal and vertical directions of the corner-cube reflector 11. A result output by the offset calculating portion 53 is input to the controlling and calculating portion 47 and the collimation optical system scanning portion 48. The control by the offset calculating portion 53 will be in detail described together with the action of the offset calculating portion 53. The distance measuring portion (EDM) 51 includes the laser source 43 and the light receiving element 44. As the distance measuring portion (EDM) 51, a range finder disclosed in U.S. Pat. No. 4,413,904 can be employed. The laser source 43 is driven by a command of the controlling and calculating portion 47. An output of the light receiving element 44 is input to the controlling and calculating portion 47 to calculate the distance between the main body 20 and the corner-cube reflector 11. A calculated result of the distance is sent to the portable electronic device 13 via the wireless communicator 15. The mode displaying lamp 54 serves as a part of an informing portion by which a worker stationed on the side of the corner-cube reflector 11 can judge that the main body 20 is operating in a searching, tracking, or measuring mode. The controlling and calculating portion 47 controls the mode displaying lamp 54 as follows: Before the measurement, the mode displaying lamp 54 is turned off. When the corner-cube reflector 11 is out of the sight of the collimation optical system 21 and the searching mode is selected, the mode displaying lamp 54 is lighted. When the corner-cube reflector 11 is within the sight of the collimation optical system 21 and the reflector 11 is being tracked, the mode displaying lamp 54 is turned on and off regularly. When the corner cube reflector 11 is within the sight of the collimation optical system 21 and the main body 20 selects the measuring mode after the completion of the tracking of the corner-cube reflector 11, the mode displaying lamp 54 is turned on and off more hurriedly than when the reflector 11 is being tracked. In this embodiment, the mode displaying lamp 54 is designed to be directed in the sale direction as the optical axis 0 of of the collimation optical system 21.

Figure 10:
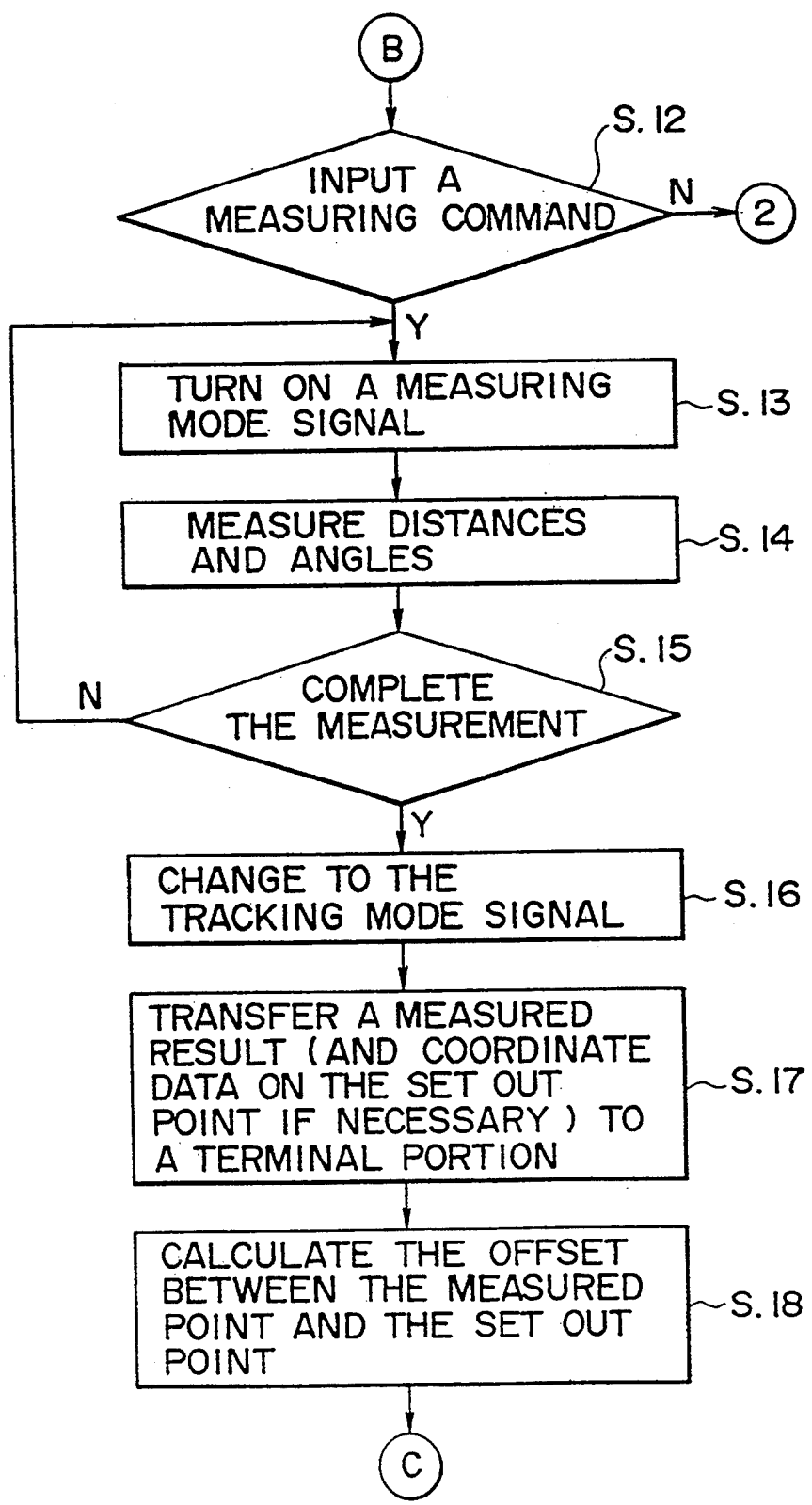
FIG. 10 is a flowchart showing a middle stage of the surveying process.
Figure 11:
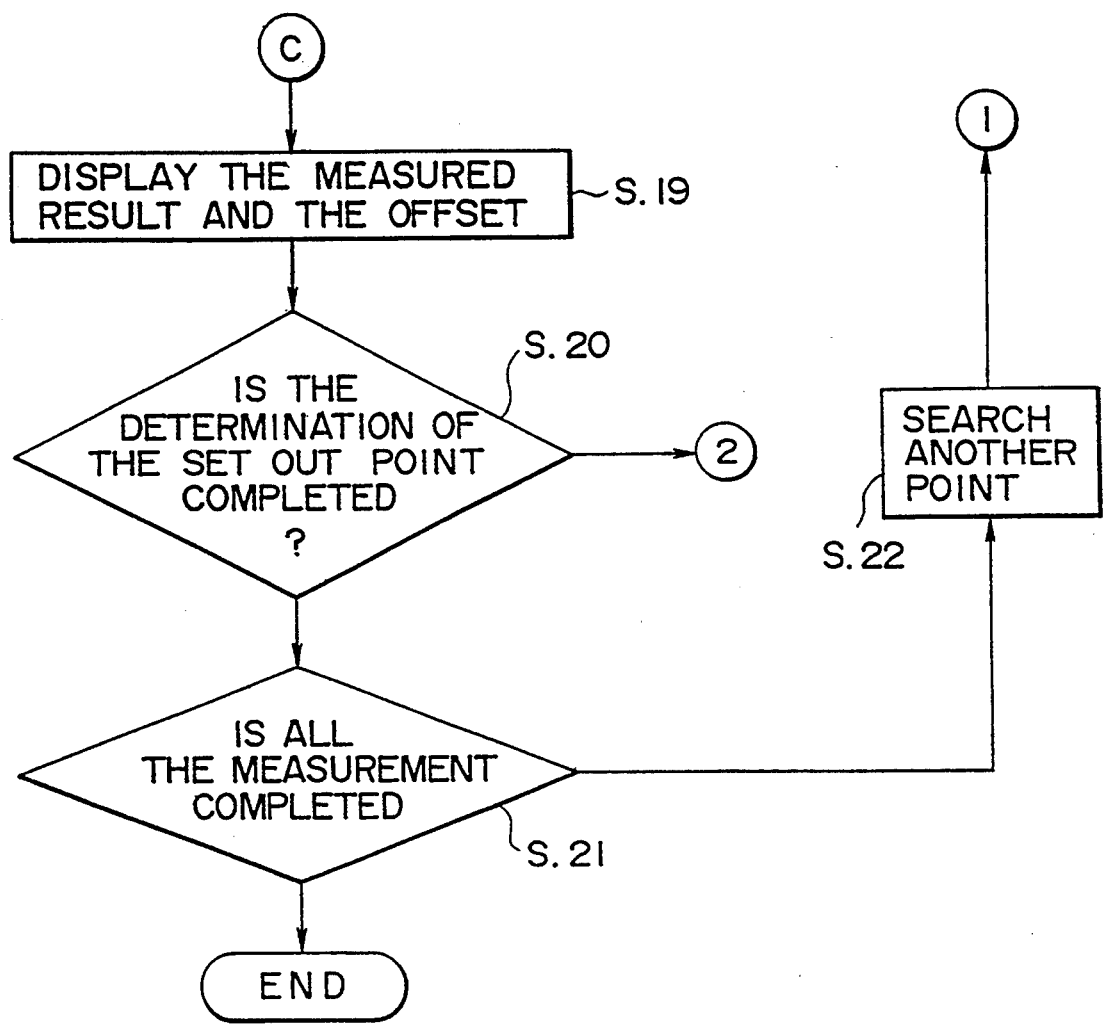
FIG. 11 is a flowchart showing a late stage of the surveying process.

The portable electronic device 13 comprises a portable body 13A and a wireless communicator 13B. The portable body 13A includes a calculating portion 55, operating portion 56, data memory 57, and displaying portion 58. The function of the portable electronic device 13 will be in detail described with reference to the flowcharts in FIGS. 9–11 and the schematic views in FIGS. 12A, 12B, 13A and 13B.

First, coordinate data on a reference point R and a set out point S are input by operating the operating portion 56 (Step 1). Instead of setting the reference point R just under the main body 20 in this embodiment, the reference point R may be set at a known point away from the main body 20. The coordinate data on the set out point S may be input on the side of the electronic circuit 46. That is, as shown by the stitch line in FIG. 8A, the controlling and calculating portion 47 may be provided with an operating portion 56a and a data memory 57a to store the data on the point S. In this case, the portable body 13 is not necessarily provided with the operating portion 56 and the data memory 57.

The calculating portion 55 of the portable electronic device 13 transfers the coordinate data on the reference point R and the set out point S to the data memory 57 to store the data. A transfer starting command is input by operating the operating portion 56 and then the calculating portion 55 outputs a search starting command and collimation data on the reference point R to the wireless communicator 13B. The wireless communicator 13B transfers the search starting command and the collimation data toward the wireless communicator 15 (S. 2). The wireless communicator 15 receives the search starting command and the collimation data. On receipt of them, the controlling and calculating portion 47 starts the measurement (S. 3). The controlling and calculating portion 47 outputs a scanning command to the tracking beam scanning portion 49 so as to tracking and scanning the corner-cube reflector 11 (S. 4). Further, the controlling and calculating portion 47 outputs a continuous light signal to the mode displaying lamp 54 so as to light continuously (S. 5). When the corner-cube reflector 11 is out of sight, the infrared beam of light P' as a tracking beam of light is not received by the light receiving element 40 and therefore the output of the tracking beam receiving portion 50 remains 0. According to the output thereof, the controlling and calculating portion 47 judges whether the tracking beam is received or not (S. 6). When the tracking beam is not received, the controlling and calculating portion 47 controls the collimation optical system scanning portion 48 to rotate the collimation optical system 21 (i.e., telescope) (S. 7). The control of the collimation optical system scanning portion 48 is repeated until the corner-cube reflector 11 comes into the sight of the collimation optical system 21. Thereby, it is searched whether the corner-cube reflector is within the sight of the collimation optical system 21 or not. When the corner-cube reflector 11 comes into the sight of the collimation optical system 21, the output of the tracking beam receiving portion 50 varies. Thereby, the controlling and calculating portion 47 judges whether the corner-cube reflector 11 is within the sight of the collimation optical system 21. The offset calculating portion 53 detects points, at which the output of the tracking beam receiving portion 50 is received, in the horizontal and vertical directions of the measuring sight. According to a result detected thus, the amounts of offset in the horizontal and vertical directions are each calculated between the corner-cube reflector 11 and the optical axis 0 of the collimation optical system 21 (S. 8).

The offset calculating portion 53 judges whether the amount of offset is within a given range or not (S. 9). If it is out of the given range, i.e., the corner-cube reflector 11 does not coincide with the optical axis 0 of the collimation optical system 21, a fine adjustment signal is output to the collimation optical system scanning portion 48 to correct a slight offset (S. 10) and Steps 5, 6, 8, and 9 are repeated. If the corner-cube reflector 11 coincides with the optical axis 0 of the collimation optical system 21, a signal indicating no offset is output to the controlling and calculating portion 47. According to this signal, the controlling and calculating portion 47 outputs a signal for flashing in a long cycle to the mode displaying lamp 54 so that the lamp 54 shines intermittently (S. 11). The worker observes the mode displaying lamp 54 from the side of the corner-cube reflector 11 and finds that the main body 20 is operating in the tracking mode. The controlling and calculating portion 47 judges whether a measuring command was received or not (S. 12). If there is no input of the measuring command, Steps 9, 11, and 12 are repeated.

Next, when the measuring command is input by operating the operating portion 56, the measuring command is transferred by the wireless communicator 13B and then the controlling and calculating portion 47 outputs a signal for flashing in a short cycle to the mode displaying lamp 54 so that the lamp 54 goes on and off at shorter intervals than in the tracking mode. Thereby, the worker stationed on the side of the corner-cube reflector 11 finds that the main body 20 is operating in the measuring mode. That is, the controlling and calculating portion 47 serves not only as the mode judging portion for judging that the main body 20 is in the tracking or measuring mode but also as a part of the informing portion for informing some of its judged results. Next, the controlling and calculating portion 47 outputs a distance measuring command signal to the electro-optical distance measuring portion (EDM) 51. According to this command signal, the EDM portion 51 and encoder 52 measure the distance D and horizontal and vertical angles H, V between the main body 20 and the corner-cube reflector 11 (S. 14). The controlling and calculating portion 47 judges whether the measurement was completed or not (S. 15). The mode displaying lamp 54 keeps flashing until the measurement is completed. When completed, the controlling and calculating portion 47 outputs a long-cycle flashing signal to the mode displaying lamp 54 so that the lamp 54 goes on and off at longer intervals than in the measuring mode (S. 16). Thereby, the worker can confirm the completion of the measurement. The controlling and calculating portion 47 transfers its measurement results to the wireless communicator 15. The wireless communicator 15 transfers the results (distance D and horizontal and vertical angles H, V) to the wireless communicator 13B (S. 17). On the basis of the results received by the wireless communicator 13B, the calculating portion 55 calculates the difference between the set up point S and the measured point Q (S. 18). The calculating portion 55 outputs its calculated result to the displaying portion 58. The displaying portion 58 indicates the result in the form of, for example, polar coordinates (S. 19). If the coordinates of the set up point S are stored in the data memory 57a of the main body 20, coordinate data on the set up point S are also transferred together with the measured results from the wireless communicator 15 to the wireless communicator 13B.

An example of displaying the polar coordinates will now be described.

Figure 12A:
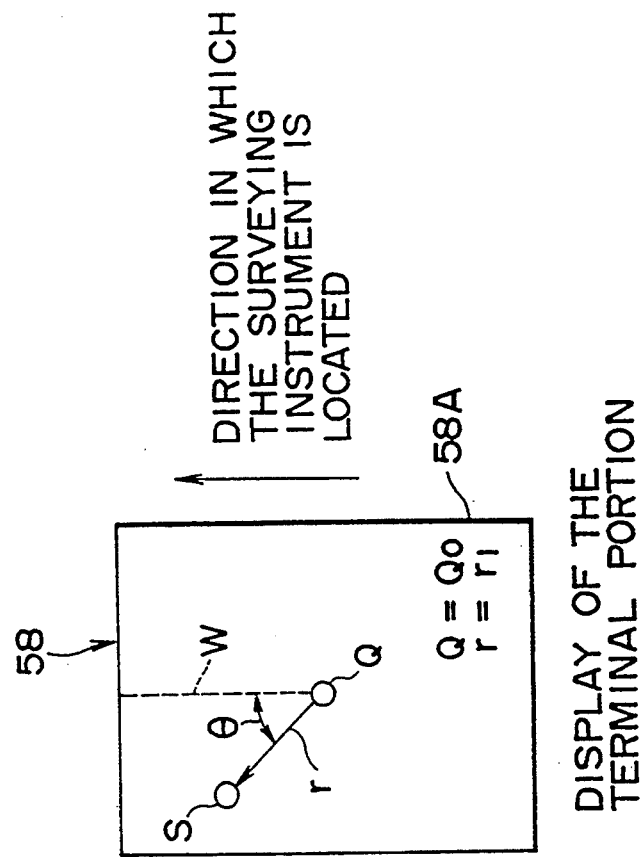
FIGS. 12A and 12B are descriptive drawings showing a positional relationship of a set up point, measured point, and position of the main body of the surveying instrument and a display on which those points and position are shown.
Figure 12B:
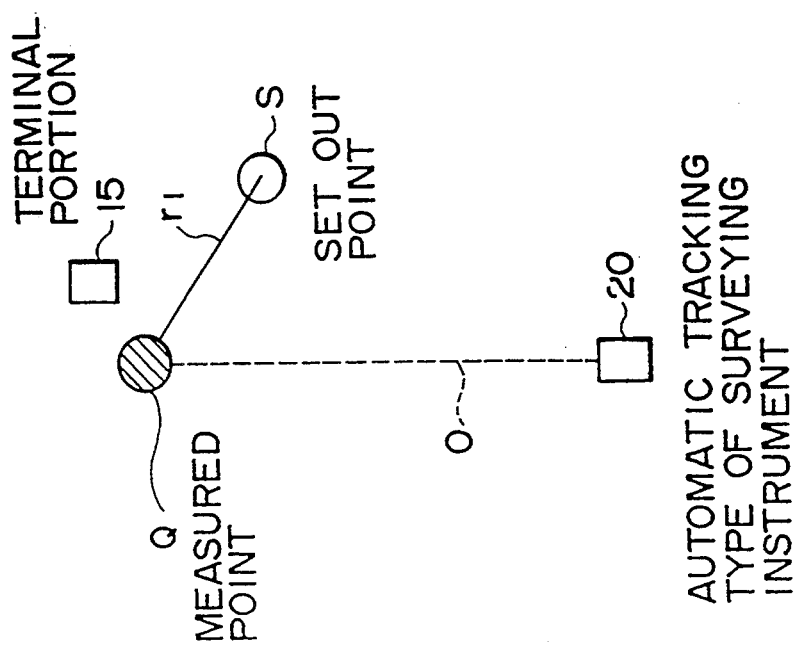
Figure 13B:
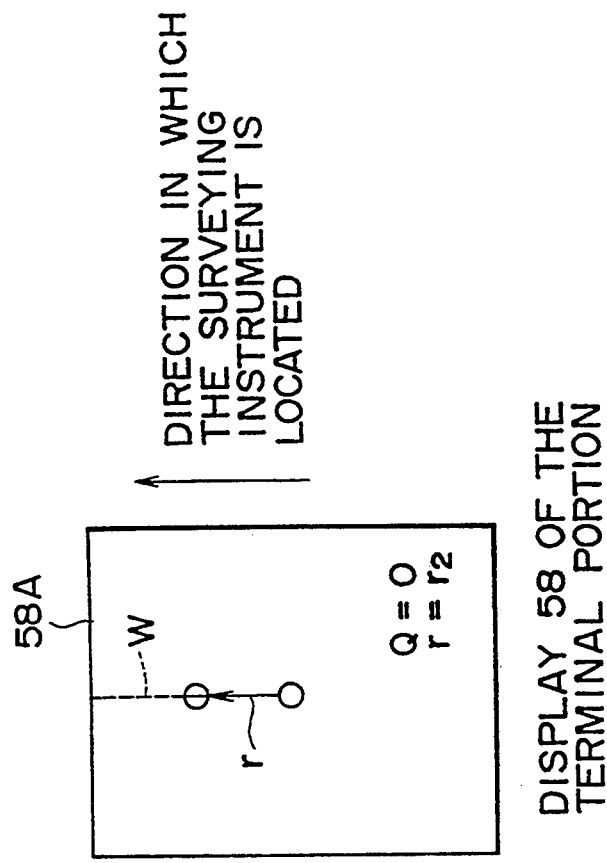
FIGS. 13A and 13B are descriptive drawings showing another positional relationship of the set up point, measured point, and position of the main body of the surveying instrument and the display on which those points and position are shown.
Figure 13A:
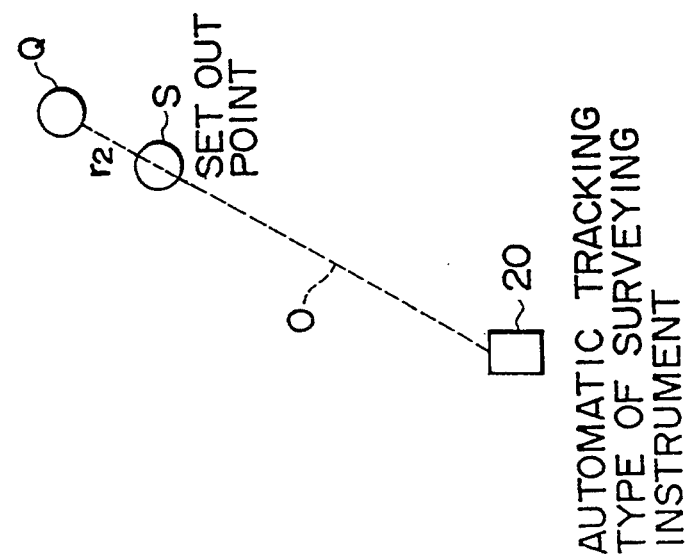
Figure 14:
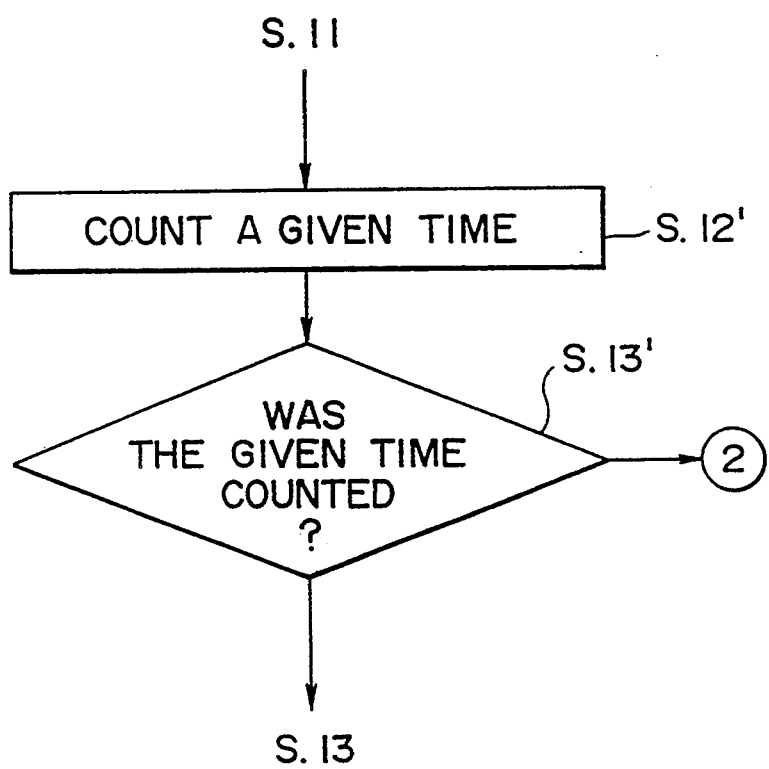
FIG. 14 is a part of a flowchart showing another example of the surveying process of the surveying instrument.

If the measured point Q, the set up point S, and the optical axis 0 of the main body 20 are positioned as shown in FIG. 12a, the points Q and S are displayed on a face 58A of the displaying portion 58 and further $r$ and $\theta$ are displayed thereon in the form of polar coordinates where $r$ is a radius vector from the measured point Q as a pole to the set up point S and $\theta$ is a direction or deviation angle of the set up point S with respect to an original line W corresponding to the optical axis 0 as shown in FIG. 12b. If the points Q and S coincides with the optical axis 0 as shown in FIG. 13a, the direction and the original line W coincide with each other as shown in FIG. 13b.

If a coincidence is brought about between the coordinate system of the distance D to the point Q and horizontal and vertical angles H, V and the coordinate system of the set out point $S(x_S, y_S)$, $r$ and $\theta$ are represented as follows:

$$r = \sqrt{(D\cos V \cdot \cos H - x_S)^2 + (D\cos V \cdot \sin H - y_S)^2}$$

$$\theta = \tan^{-1}\{(D\cos V \cdot \cos H - x_S)/(D\cos V \cdot \sin H - y_S)\}$$

When the set up point S is determined in the above manner, the worker causes the controlling and calculating portion 47 to judge that the determination of the set up point S is completed (S. 20). Next, the controlling and calculating portion 47 judges whether all the measurement is completed or not (S. 21). If all the measurement is not completed, a step for determining another set up point is selected (S. 22). The stage goes back to Step 3 from which the same procedures are repeated.

Referring to visible light guided to the focusing mirror 30 via the objective lens 25, optical path splitting prism 27, focusing lens 28, and Porro prism 29, the worker can observe a visible image formed on the focusing mirror 30 through the eyepiece 31 and can collimate, for example, the corner-cube reflector 11 by adjusting the focusing lens The invention is not limited to the above embodiment. Instead of that the flashing state of the mode displaying lamp 54 is changed to confirm the tracking or measuring mode, the color of the lamp 54 may be changed to do so. Further, instead of mounting the mode displaying lamp 54 on the main body 20, the lamp 54 may be mounted on the terminal portion 13 so that mode information about the controlling and calculating portion 47 is transferred from the wireless communicator 15 to the terminal portion 13 to display the mode of the main body 20 on the terminal portion 13.

Since the surveying instrument according to the invention is arranged as mentioned above, it is accomplished without any trouble that no worker is stationed on the side of the main body of the instrument. Especially, it is possible to confirm whether the position of the target located away from the terminal portion has been measured or not.

What is claimed is:

1. A surveying instrument comprising:
   a main body including a measuring unit capable of operating in a tracking mode in which a target for searching a set out point to be set out at a desired point of land is tracked and a measuring mode in which a position of said target is measured; and
   a terminal portion located away from said main body;
   said main body further including:
      a first communication unit for transmitting data concerning a target position measured by said measuring unit to said terminal portion;
      a mode judging unit for judging that said measuring unit is operating in said tracking or measuring mode; and
      a result informing unit for informing a result obtained by said mode judging unit toward the side of said target;
   said terminal portion including:
      a second communication unit for receiving data transmitted from said first communication unit;
      a memory unit for storing position data concerning said set out point;
      a calculating unit for calculating a difference between the positions of said set out point and said target on the basis of data concerning said set out point stored in said memory unit and data transmitted from said main body; and
      a display unit for displaying said difference.

2. A surveying instrument comprising:
   a main body including a measuring unit capable of operating in a tracking mode in which a target for searching a set out point to be set out at a desired point of land is tracked and a measuring mode in which a position of said target is measured; and
   a terminal portion located away from said main body;
   said main body further including:
      a memory unit for storing position data concerning said set out point;
      a first communication unit for transmitting data concerning a target position measured by said measuring unit and data concerning said set out point stored in said memory unit to said terminal portion;
      a mode judging unit for judging that said measuring unit is operating in said tracking or measuring mode; and
      a result informing unit for informing a result obtained by said mode judging unit toward the side of said target;
   said terminal portion including:
      a second communication unit for receiving data transmitted from said first communication unit;
      an calculating unit for calculating a difference between the positions of said set out point and said target on the basis of data transmitted from said main body; and
      a display unit for displaying said difference.

3. A surveying instrument according to claim 1 or 2, wherein said informing unit includes a mode displaying lamp in which a color of light or flashing state of said lamp is changed in order to judge that the measuring unit is operating in said tracking or measuring mode.

4. A surveying instrument according to claim 1 or 2, wherein said terminal portion receives mode information of said informing unit and informs that said measuring unit is operating in said tracking or measuring mode.

5. A surveying instrument according to claim 1, said measuring unit further including:
   an optical unit for projecting a beam of light to the outside of said instrument, receiving the beam of light reflected by said target, and guiding it to a light receiving unit, said optical unit being movably mounted on said main body so as to face toward said target;
   a distance measuring unit for measuring a distance between said target and said measuring unit on the basis of a signal output by said light receiving unit; and
   a moving unit for moving said optical unit, so that a coincidence is brought about between a collimation line of said optical unit and a direction of said target, and tracking said target.

* * * * *